Figure 1:
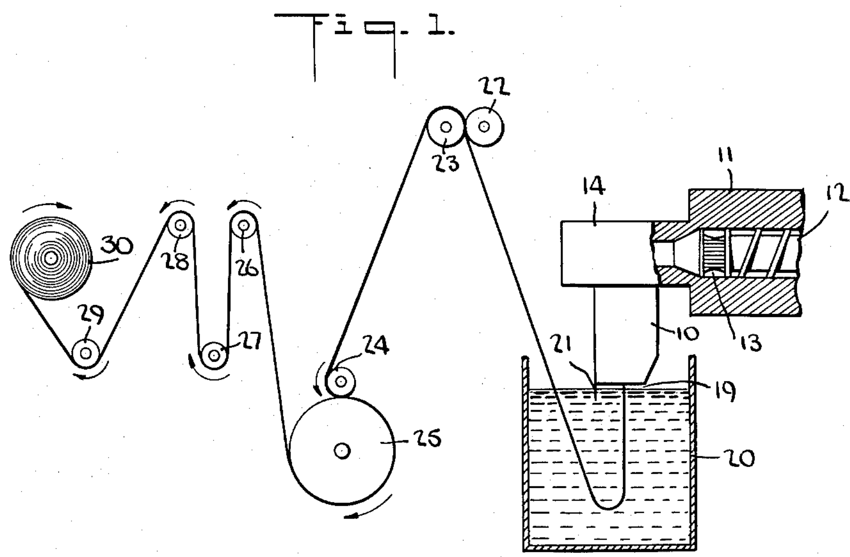

Feb. 14, 1961 S. N. WEISSMAN 2,971,222

EXTRUSION OF UNIFORM FILM OF HIGH DENSITY POLYETHYLENE

Filed May 28, 1958 3 Sheets-Sheet 1

Fig. 3.
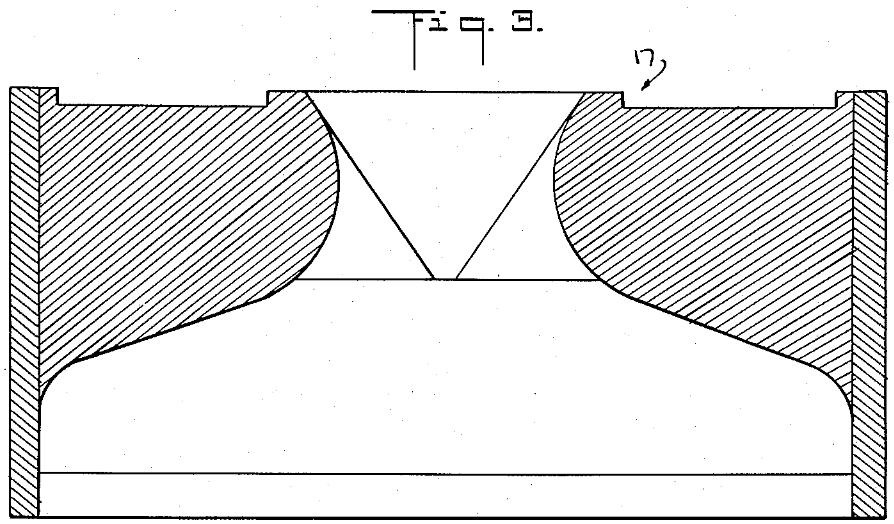
Fig. 4.
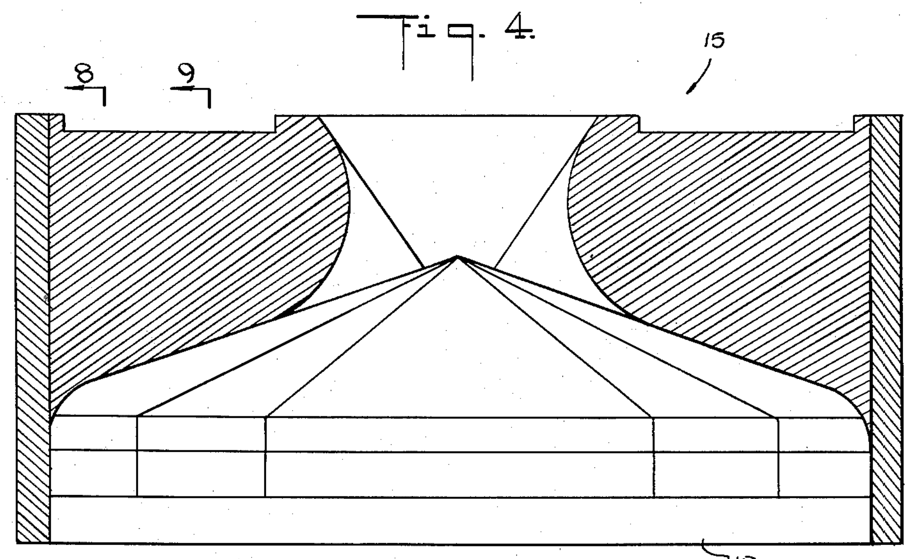
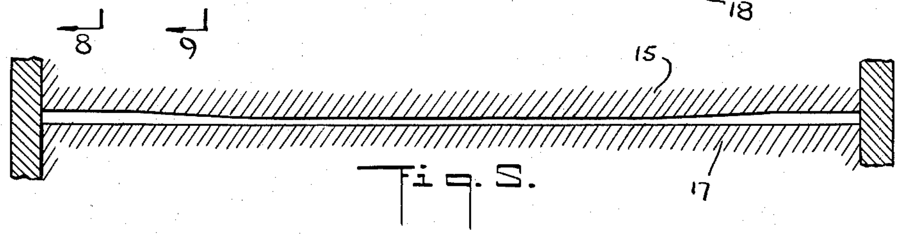
Fig. 5.

EXTRUSION OF UNIFORM FILM OF HIGH DENSITY POLYETHYLENE
Filed May 28, 1958 3 Sheets-Sheet 3
Fig. 6.
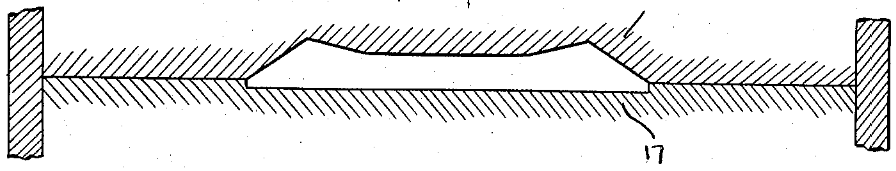
Fig. 7.
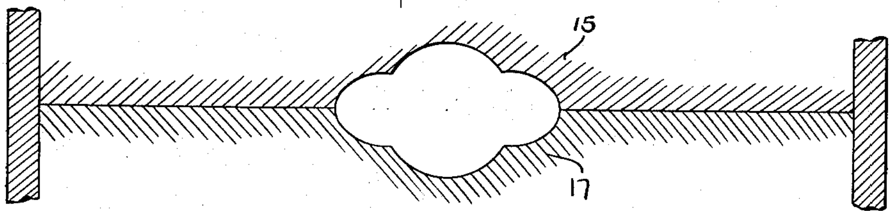
Fig. 10.
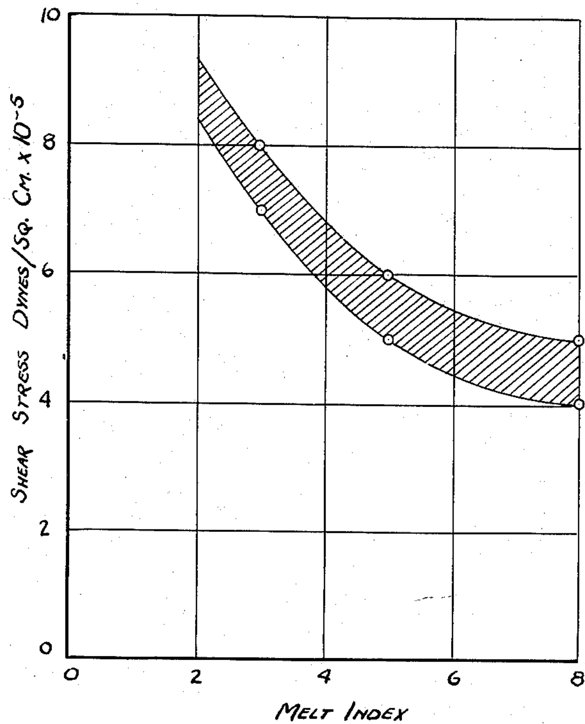
Fig. 8.
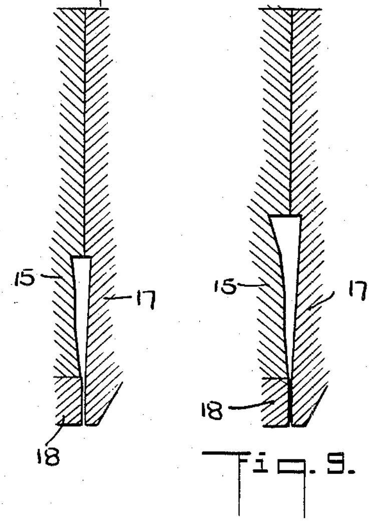
Fig. 9.

United States Patent Office 2,971,222

Patented Feb. 14, 1961

2,971,222

EXTRUSION OF UNIFORM FILM OF HIGH DENSITY POLYETHYLENE

Stanley N. Weissman, Cedar Grove, N.J., assignor to Celanese Corporation of America, New York, N.Y., a corporation of Delaware Filed May 28, 1958, Ser. No. 738,392

8 Claims. (Cl. 18—57)

This invention relates to the extrusion of film and more particularly to the extrusion of films of high density polyethylene resins.

Polyethylene resins are known to be useful in the preparation of self-supporting films. The polyethylene resins which first gained commercial success were those which were of relatively low density, below about 0.93, and of relatively low tensile strength and softening point. Recent polyethylene resins of increased density and stiffness and higher softening points prepared by ordered polymerization have achieved commercial importance. Linear polymers of polyethylene have a high degree of crystallinity and a more compactible molecular structure due to the decrease in branching.

It has been found that methods for the extrusion of flat, self supporting film which were satisfactory with respect to the extrusion of films of low density polyethylene are not satisfactory for the extrusion of films from high density polyethylene even after raising the extrusion temperature to compensate for the higher softening point of the latter resins.

Low density polyethylene is generally extruded, for flat films, in a system comprising a screw extruder and a manifold-type slit die, having a horizontally disposed long cylindrical reservoir from which the resin melt is drawn off downwardly through a narrow slit having parallel walls, set about ⅛ inch apart, to a pair of adjustable orifice jaws set in an opening of from about 10 to about 30 mils. A general description of the method of extruding flat film from low density polyethylene resin may be found at pages 357 and 358 of "Polythene" by Renfrew and Morgan, published in 1957 by Interscience Publishers, Inc. of New York City. It has been found that when high density polyethylene resin is extruded in this type of system, surging occurs due to the pulsations in the pressure developed by the screw and that the thickness of the film produced may vary by amounts which in a thin film represents as much as an eightfold difference between the thick and the thin portions thereof.

It is an object of this invention to provide a method of extruding uniform, flat film of good appearance, from high density polyethylene resins. Other objects will appear hereinafter.

The objects of this invention are achieved by a method for extruding a flat, thin gauge film of high density polyethylene resin which comprises forming a melt of said resin, extruding said melt through a walled path, at least 4 inches in length, said path being extended in width and converging in thickness at a progressively decreasing rate, beginning between about 1.0 and 2.0 inches per inch of path and ending at about 0.02 to 0.04 inches per inch of path, to a wide thin orifice having an opening of between about 2 and about 30 mils.

For purposes of convenience, length is described as the direction of flow of the resin, width as the direction corresponding to the direction of the width of the film product and thickness as the direction corresponding to the direction of the thickness of the film product.

Figure 2:
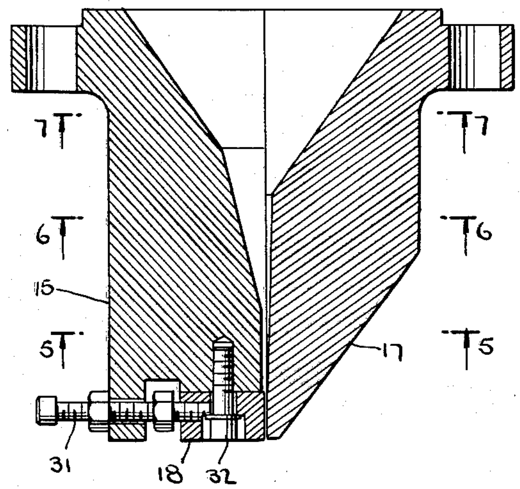

The details of the invention may be understood by reference to the drawings in which Figure 1 is a schematic representation of the extrusion system and its elements, partly in section, Figure 2 is a cross sectional view of the extrusion die, taken perpendicular to the plane of the extruded film, Figure 3 is a plan view of the lower jaw of the extrusion die, Figure 4 is a plan view of the upper jaw of the extrusion die, Figure 5 shows the contour of the opening between the jaws at 5—5 of Figure 2, Figures 6 and 7 show the contour of the opening between the jaws at 6—6 and 7—7 of Figure 2, respectively, and Figures 8 and 9 show the contour of the opening between the jaws at sections 8—8 and 9—9 of Figure 4, respectively.

Figure 10 is a representation of optimum extrusion conditions for resins of different melt indices in the most preferred range.

In a specific embodiment of the extrusion process of this invention, a polyethylene resin having a density of 0.96 and a melt index of 5.0 is introduced into extruder 11, through a hopper, not shown, at the rate of about 30 pounds per hours. The extruder 11 has an extruder screw 12, 2.5 inches in diameter, having a length/diameter ratio of 15 to 1 and a compression ratio of 3.5 to 1. The screw rotates at 30 r.p.m. and reduces the resin to a melt in its final section with the aid of heat conducted to the final section by band heaters, not shown. The melt, at a temperature of about 575° F., is passed through a pack of five mesh screens and a breaker plate, shown collectively at 13, and then through the 90° angular attachment piece 14 to die 10.

Die 10 is composed of an upper jaw 15, shown on the left side of Figure 2 and a lower jaw 17, shown on the right side of Figure 2. The jaws are shaped to provide a flow path for the resin melt which is generally divergent in width and convergent in thickness, as described in greater detail below. There are cartridge heaters (not shown) in both jaws to maintain the temperature of the resin melt at a level not lower than 575° F. in the die. At the lower end of the die, adjustable plate, or die blade 18, is attached to upper jaw 15 and forms with lower jaw 17, a rectangular orifice 13 inches in width by 8 mils in thickness through which the resin is extruded as a film at about 12 feet per minute. The land length of the orifice (thickness of die blade 18) is ¾ inch. The position of die blade 18 may be adjusted by threaded bolts 31 and fixed in desired position by threaded bolts 32.

Returning to Figure 1, the film extruded through the rectangular orifice passes through an air space 19 of about ¼ inch to a water bath 20 maintained at 120° F. A dam 21, in close proximity to the film entry point of the water surface prevents the formation of large ripples which would create variations in the air space. The film is hardened by the water bath and passes between driven rolls 22 and 23 and then between driven rolls 24 and 25. Rolls 22 and 23 are driven at a peripheral speed of about 100 feet per minute, resulting in a reduction of film gauge to about 1 mil. Rolls 24 and 25 are driven at a somewhat higher speed to maintain tension. The film then passess over idler rolls 26, 27, 28 and 29 and finally to driven wind-up roll 30.

During the course of its path through die 15 the path of the resin melt is converted from one of circular cross section of 4½ inch diameter to one of rectangular cross section 13 inches in width and 8 mils in thickness. As shown in Figures 2 to 9, the circular path flattens to a double bell-shaped path (Figure 7), decreasing in thickness at its center at the rate of about 1.44 inches per inch of path for the first 2⅛ inches thereof. With the decreased convergence rate of the upper jaw at this point and the decreased convergence rate of the lower jaw about an inch further along the path the rate of decrease in thickness drops first to about 1.0 inch per inch of path and then to about 0.35 inch per inch of path. The shape of the path at this point is shown in Figure 6. At about 1¼ inches above the adjustable plate 18, the convergence rate of upper jaw 15 decreases once more so that the rate of decrease in the thickness of the path just before the land drops to about 0.03 inch per inch of path and so that the final thickness of the walled path just before the die blade is about 0.06 inch. A cross section of the path during this section is shown at Figure 5. The thickness of the path decreases at a progressively lesser rate at portions other than the center, as shown in Figures 8 and 9.

Upon reaching the die blade 18, the thickness of the resin path is sharply restricted to about 8 mils and the resin melt passess out of the die into air space 19.

In its optimum aspect the process, by extrusion of the resin melt through the convergent path, permits the development of shear stresses considerably in excess of those obtained when extruding high density polyethylene through the manifold-type slit die used with low density polyethylene. The shear stress is determined by the pressure drop passing through the die and the die dimensions and is expressed by the equation $$S.S. = \frac{\Delta PR}{L}$$

in which S.S. is the shear stress, $\Delta P$ is the pressure drop passing through the die. R is ½ the thickness of the orifice and L is the length of the die. When $\Delta P$ is in pounds per square inch and R and L are in inches, the figure is multiplied by 69,000 in order to obtain the shear stress in dynes per square centimeter.

The optimum level of shear stress is dependent on the melt index of the resin used. For best results, the shear stress used for a resin of particular melt index between about 2.0 and 8.0 should be within the shaded area of accompanying Figure 10, wherein shear stress is plotted against the melt index of the high density polyethylene resin. In the specific embodiment described above the shear stress developed was 500,000 dynes/sq. cm.

While the invention has been described in detail with respect to a particular resin and particular process conditions, it is to be understood that it is applicable to other resins and other process conditions without sacrifice in effectiveness.

It is preferred to use polyethylene resins having densities between about .95 and about .97 and melt indices between about 0.1 and about 10.0. For best results, the melt index should be between about 2.0 and 8.0. The length/diameter ratio of the extruder screw may vary from 15 to 1 to 25 to 1 and the compression ratio from 3 to 1 to 5 to 1. The screw speed may vary from about 20 r.p.m. to about 200 r.p.m.

The temperature of the melt just prior to entering the extrusion die should be between about 550° F. and about 600° F. The geometry of the extrusion die may vary provided that the path through the die is at least 4 inches, and preferably from 4 to 8 inches, in length and converges progressively in thickness, from a rate between about 1.0 to 2.0 inches per inch of the path, to a rate between about 0.02 and about 0.04 inches per inch of path. The die opening should be maintained between about 2 and about 30 mils (depending upon resin melt index, and screw speed) when the die is in its heated state. The width of the die, in commercial installations, will ordinarily range from about 40 to about 70 inches. The extrusion rate at the die opening will ordinarily range from about 5 to about 25 feet per minute.

The temperature of the water bath should be maintained between about 80° and 120° F. The length of the air gap should be between about ⅛ inch and ¼ inch for best results.

The final film gauge may vary from about 2 and about 50 percent of the thickness of the die opening. The film take-up rate on wind-up roll 30 may vary from about 100 to about 300 feet per minute, or from about 4 to about 30 times the extrusion rate.

It is to be understood that the foregoing detailed description is given merely by way of illustration and that many variations may be made therein without departing from the spirit of my invention.

Having described my invention what I desire to secure by Letters Patent is:

1. A process for extruding a flat, thin gauge film of high density polyethylene resin which comprises forming a melt of said resin, extruding said melt through a walled path, at least 4 inches in length, said path being extended and diverging in width and converging in thickness at a progressively decreasing rate beginning between about 1.0 and about 2.0 inches per inch of path and ending at a rate between about 0.02 and 0.04 inches per inch of path, to a wide, thin orifice having an opening of between about 2 and about 30 mils.

2. A process for extruding a flat, thin gauge film of high density polyethylene resin which comprises forming a melt of said resin, extruding said melt through a walled path, at least 4 inches in length, said path being extended and diverging in width and converging in thickness at a progressively decreasing rate beginning between about 1.0 and about 2.0 inches per inch of path and ending at a rate between about 0.02 and 0.04 inches per inch of path, to a wide, thin orifice having an opening of between about 2 and about 30 mils and adding heat to said melt during its passage through said walled path.

3. A process for extruding a flat, thin gauge film of high density polyethylene resin which comprises forming a melt of said resin, extruding said melt through a walled path, from 4 to 8 inches in length, said path being extended and diverging in width and converging in thickness at a progressively decreasing rate beginning between about 1.0 and about 2.0 inches per inch of path and ending at a rate between about 0.02 and 0.04 inches per inch of path, to a wide, thin orifice having an opening of between about 2 and about 30 mils and out of said orifice through an air gap between about ⅛ inch and ¼ inch in length and into a quench liquid.

4. The process of claim 3 wherein said quench liquid is maintained at a temperature between about 80° and about 120° F.

5. The process of claim 3 wherein the surface of said quench liquid is baffled to minimize rippling.

6. The process of claim 1 wherein said polyethylene resin melt enters said walled path at a temperature between about 450° and 600° F.

7. A process for extruding a flat, thin gauge film of high density polyethylene resin having a melt index between about 2.0 and about 8.0 which comprises forming a melt of said resin, subjecting said resin melt to a shear stress which is related to the melt index by being at a level within the shaded area of Figure 10 and passing said resin melt to a wide, thin orfiice having an opening of between about 2 and about 30 mils.

8. A process for extruding a flat, thin gauge film of high density, polyethylene resin having a melt index between about 2.0 and about 8.0 which comprises forming a melt of said resin, extruding said melt through a walled path, at least 4 inches in length, said path being extended and diverging in width and converging in thickness at a progressively decreasing rate between about 1.0 and about 2.0 inches per inch of path and ending at a rate between about 0.02 and 0.04 inches per inch of path, to a wide, thin orifice having an opening of between about 2 and about 30 mils, said resin melt being subjected in said path to a shear stress which is related to the melt index by being at a level within the shaded area of Figure 10.

References Cited in the file of this patent

UNITED STATES PATENTS

| | | |
|---|---|---|
| 2,061,407 | Royle | Nov. 17, 1936 |
| 2,090,404 | Parkhurst | Aug. 17, 1937 |
| 2,499,421 | Samler | Mar. 7, 1950 |
| 2,715,256 | Siegrist | Aug. 16, 1955 |
| 2,734,224 | Winstead | Feb. 14, 1956 |
| 2,774,106 | Bether | Dec. 18, 1956 |

OTHER REFERENCES

Kaufmann: "Higher-Density Polyethylene," from Modern Packaging, April 1957, 6 pp.